Dec. 20, 1932.  J. S. LOEWUS  1,891,285
SHAFT COUPLING
Filed March 12, 1931   2 Sheets-Sheet 1
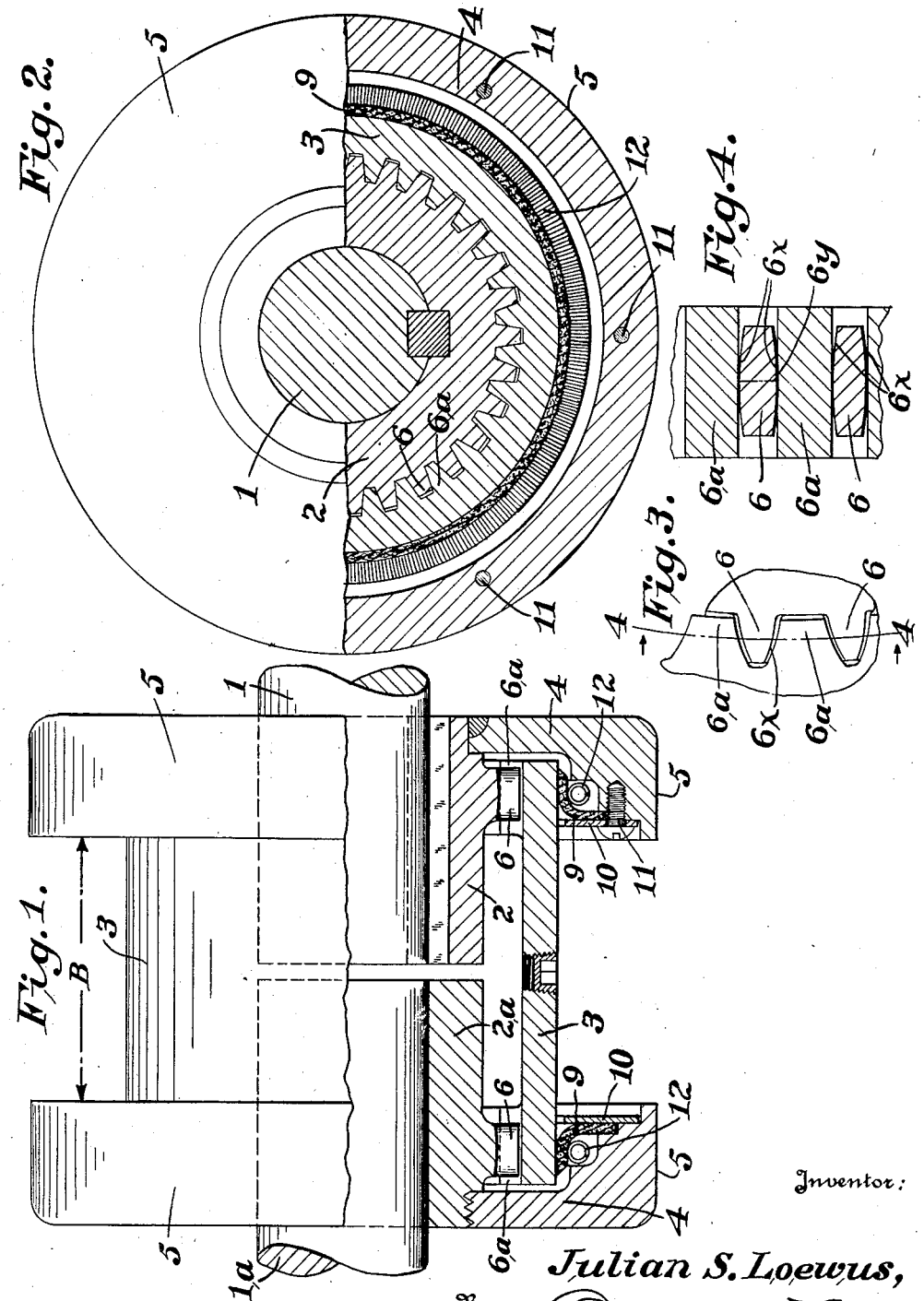
Inventor:
Julian S. Loewus,
By
Attorneys.

Dec. 20, 1932.   J. S. LOEWUS   1,891,285
SHAFT COUPLING
Filed March 12, 1931   2 Sheets-Sheet 2
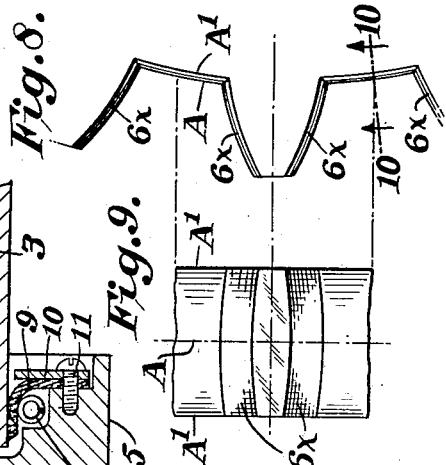
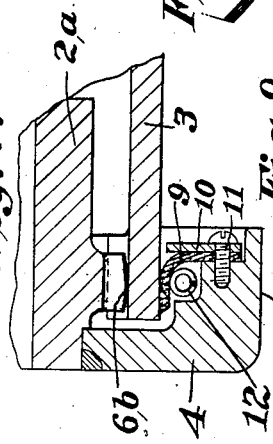
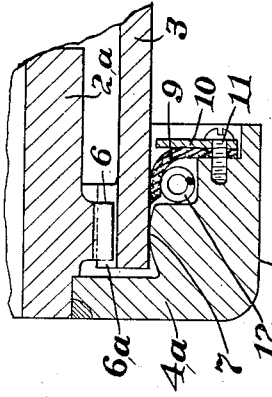
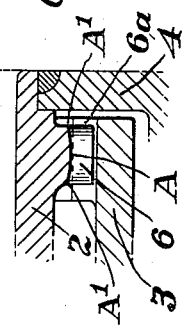
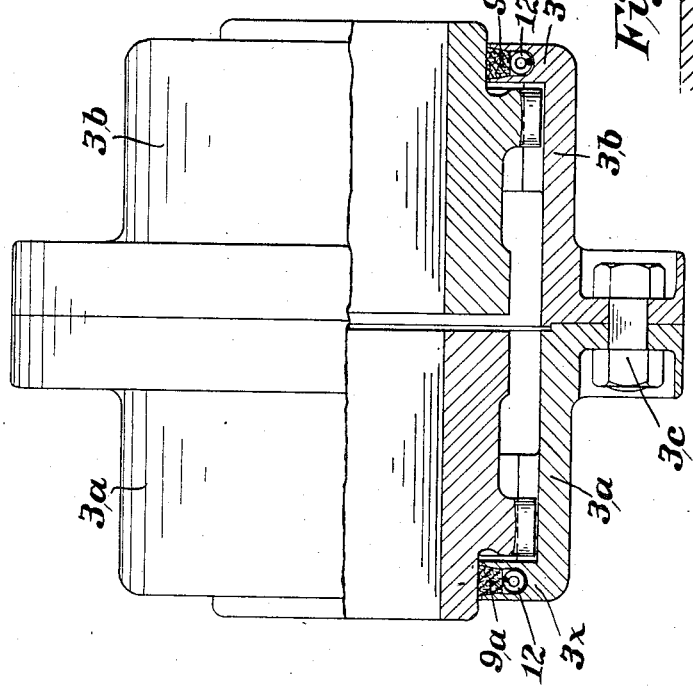
Inventor:
Julian S. Loewus,
By Spear, Donaldson & Hall
Attys.

Patented Dec. 20, 1932

1,891,285

UNITED STATES PATENT OFFICE

JULIAN S. LOEWUS, OF BALTIMORE, MARYLAND

SHAFT COUPLING

Application filed March 12, 1931. Serial No. 522,036.

The invention concerns a rotary shaft coupling to connect the ends of a driving and driven shaft and to compensate for misalignment of said shafts. Ordinarily such couplings include shaft hubs secured to the contiguous ends of the driving and driven shafts and an enclosing sleeve or casing for said shaft hubs, said sleeve being formed in sections divided from each other at about the center of the length of the sleeve, said division being in a plane transverse to the axis of the sleeve. Between the sleeve and the shaft hubs a toothed connection is ordinarily provided to impart motion from one to the other, and provision is made also to furnish a so called rocking bearing by which the sleeve is supported and said sleeve and shaft hubs will adjust themselves while maintaining the driving connection, to compensate for any misalignment of the shafts.

With a coupling constructed substantially as above mentioned, the degree of misalignment of the shaft ends, or the existence of misalignment, cannot be ascertained without taking the coupling apart to get at the shaft ends or their hubs because these under the above construction are enclosed within the sleeve. One object of my invention is to provide indicator and testing means external to the coupling by which misalignment of the shaft can be ascertained together with the degree of misalignment, without dismembering the coupling.

Another object is to provide teeth of such form and arrangement as will afford a support for the sleeve.

A still further object of this invention is the provision of a flexible packing means between each of the shaft hubs and the sleeve which will function to maintain a fluid tight seal between said members irrespective of whether they are in alignment or not. Heretofore in couplings of this type the conventional packing means employed failed to accommodate itself to any degree of misalignment of the coupling members with the consequent creation of a slight gap between a portion of the packing means and one of the cooperating coupling members which gap permitted the escape of lubricant from within the coupling. In view of this characteristic in couplings of this type they could only be filled with lubricant up to the level of the inner portion of the top of the end plate. With the provision of a packing means as employed in my coupling, to be hereinafter described, it becomes possible to completely fill the coupling with oil, the escape of the same being entirely eliminated.

Other objects of the invention will be clear from the following description and the appending claims.

In the accompanying drawings:

Figure 1 is a view of the coupling partly in side elevation and in part in longitudinal section.

Figure 2 is a view partly in end elevation and partly in transverse section.

Figure 3 is a view of one form of intermeshing teeth.

Figure 4 is a sectional view of the intermeshing teeth on line 4—4 of Figure 3.

Figure 5 is a sectional view similar to Figure 1 having teeth like those of said figure but with a sleeve divided into sections.

Figure 6 is a sectional view of a modification in which the rocking bearing for the sleeve is provided on a collar extending from the shaft hub, the sleeve in this case being in one piece.

Figure 7 is a view similar to Figure 1 but with the rocking bearing provided on the crown or outer edges of the teeth.

Figure 8 is a view similar to Figure 3 but showing a slightly different form of intermeshing teeth.

Figure 9 is a plan view of the teeth of the hub member of Figure 8.

Figure 10 is a sectional view on line 10—10 of Figure 8.

In these drawings the shaft ends are indicated at 1, 1a and the hubs or blocks attached to said shaft ends are indicated at 2, 2a. The sleeve is indicated at 3 and this is of one piece instead of being formed in sections as heretofore. Attached to the outer ends of each of the shaft hubs 2, 2a is a flanged cap 4 the flanges of which extend toward each other and overlap the outer sides of said sleeve, said flanges presenting indicating or testing surfaces at 5 upon which, by laying a straight edge, misalignment of the shaft ends, if such relations exist, may be ascertained together with the degree of misalignment. The surfaces 5 are of cylindrical form, and are accurately machined to the same diameter. In view of the fact that the flanged surfaces 5 are thus machined to be of the same diameter, they consequently present accurate measuring surfaces for the determination of shaft misalignment in the manner as disclosed above. It is obvious that this misalignment, if any, may be readily determined without disassembly of the coupling.

Teeth are shown at 6 which form the driving connection between the shaft hubs and the sleeve. As mentioned above provision must be made for supporting the sleeve and allowing it to have rocking movement relative to the shaft ends to take care of misalignment. For this purpose the teeth are formed as shown in Figures 3 and 4.

This consists of curving the side face of the hub tooth from end to end thereof, as shown in Figure 4 at $6x$, the curve being such that the tooth is of greatest thickness at its medial transverse line $6y$, and is thinner at its ends. In other words, the side of the tooth has a crown shape extending lengthwise thereof from end to end. These teeth 6 on the hub part bear against the side of the teeth $6a$ on the sleeve, which latter teeth are straight sided, and thus the sleeve is supported all the way around the coupling. The sectional view of Figure 2 shows that all the teeth $6a$ bear on the teeth of the sleeve all the way around the coupling, said section being taken at the transverse medial line of the teeth.

The sleeve may be formed in sections in so far as embodying the feature of the invention just described above relating to the crown shape of the lateral faces of the teeth. The invention may be carried out also in connection with a different form of tooth connection and an independent rocking bearing.

In Figures 8 and 9 I show modifications of the tooth formation on the hub section. In this form the teeth are curved on their side faces as just described as shown at $6x$, but instead of the wall at A between the tooth projections being straight these walls are curved on an arc of a circle from A to the points $A^1$ at the back and front of the toothed formations shown in Figure 10 to furnish at this point a rocking bearing.

In Figure 5 I show a two part sleeve, the sections thereof being marked at $3a$, $3b$, bolted together at $3c$. In this form the teeth may be of the form shown in Figures 3, 4 or in Figures 8, 9, 10.

Instead of employing teeth of the form of Figures 3 and 4 and 8, 9 and 10 to provide a compensating bearing between the shaft hubs and the sleeve, I may provide this rocking bearing at 7, Figure 6, on the flanged cap $4a$, connected to the shaft hub. The sleeve in this instance may be in one piece, as in Figure 1.

This form will enable the test above referred to for misalignment because like in Figure 1 the flanged cap $4a$ presents surface 5 for this purpose.

In Figure 7 the rocking bearing is provided by the curved crown of the hub teeth as shown at $6b$. This modification can employ the sleeve in one piece and the flanged caps 4 with their peripheral surfaces 5 are employed as in Figure 1.

It is necessary to lubricate a coupling of this character and in order to retain the lubricant the flanged caps 4 have associated therewith a packing ring shown at 9 adapted to bear on the exterior surface of the sleeve. This packing is held by a ring 10 which is screwed at 11 to the flanged cap 4. A spring ring 12 presses the packing strip against the sleeve. During the rotation of the coupling, centrifugal force will throw the oil outwardly to submerge the teeth and rocking bearing.

Oil is inserted into the coupling through the removable plug shown located on the sleeve 3, Fig. 1, it being understood that the plug may be placed in any other suitable location as for example in the flanged cap 4. The coupling is to be completely filled with oil which cannot escape in view of the liquid tight seal described above, thereby insuring sufficient oil at all times for proper lubrication of the coupling. Heretofore couplings have only been filled with oil to a selected level slightly above the region of tooth contact, any excess oil promptly leaking out. With my coupling, the entire filling of the same with oil serves as a precautionary measure against the coupling ever operating without sufficient lubrication. The packing 9 will prevent any escape of oil either during the operation of the coupling or when the same is stationary.

It is apparent from the above that the packing 9 is always held against the sleeve 3 by the spring 12, consequently any misalignment of the shafts will not disturb the fluid tight seal thus established, the flexibility of the packing 9 permitting it to accommodate itself to any angular movement of the coupling members. During the operation of the coupling irrespective of whether the shafts are in alignment or not the centrifugal force set up in the oil will react against the flange caps 4 to more tightly press the packing 9 against the sleeve.

In Figure 5 is shown a different arrangement of packing $9a$ seated in a groove in the flange $3x$ of the sleeve, and pressed against the hub by a spring 12. It will be understood that in order not to multiply figures of the drawings I have not shown the different assemblies of the various features of the invention but where any form may have embodied therein any feature shown in connection with another form, it is to be considered as embodied therein.

The pressure generated from centrifugal force on the oil serves to maintain the packing ring in firm sealing contact with the exterior of the sleeve to prevent the escape of oil.

With my invention misalignment of the shaft ends can be ascertained at any time by applying a ruler or straight edge to the testing surfaces 5 of the flanged caps 4 and without taking apart at any time any portion of the coupling. This allows the sleeve to be made in one piece as it is not necessary to disjoint the coupling in order to ascertain whether or not misalignment exists.

It will be noted from Figs. 1 and 7 that the seal for the lubricant is in the transverse plane passing through the center of the rocking bearing furnished by the teeth.

This has its best application where the teeth furnish the rocking bearing but this part of the invention is not limited in this respect as the rocking bearing may be provided in some other way.

This enables me to get a more perfect seal than in the case of a position of the sealing medium to one side of the center line.

The shaft hubs 2, 2a, and the length of the sleeve 3 are so designed that, the inner ends of the hubs 2, 2a when positioned on the ends of the shaft 1, 1a are to be spaced a definite selected distance apart to insure proper operation of the coupling. The flanges of the caps 4 which extend toward each other are made of the same depth, so that there is established between the inner peripheral edges thereof when the coupling is attached to the shaft a definite distance B shown in Figure 1, which distance B, bears a certain predetermined ratio or relation to the above established distance between the shaft ends so that by taking the measurement of this distance it can be ascertained whether or not the shaft ends are properly positioned in relation to each other, say, for instance, an eighth of an inch apart.

I claim:

1. In combination, shaft hubs, a surrounding sleeve, intermeshing teeth on the hubs and sleeve, collars extending from the hubs, closing the ends of the coupling and having portions overlying the outer surface of the sleeve, and packing attached to said collars and bearing against the outer surface of the sleeve, said packing being subject to the pressure of the oil due to centrifugal force for pressing said packing against the sleeve.

2. In combination with shaft hubs having teeth, a sleeve surrounding the shaft hubs and having teeth meshing with that of the said shaft hubs, members fixed to the shaft hubs and having walls which enclose the end portions of the sleeve and extend over the outer side of the sleeve and spaced apart therefrom, flexible packing material attached to the outer walls of said members and having their free inner portions bearing on the outer side of the sleeve and extending along the same in a direction towards the end of the sleeve, said flexible packing being subject to pressure from the oil under centrifugal force, substantially as described.

3. In combination with shaft hubs having teeth, a sleeve surrounding the shaft hubs and having teeth meshing with those of the hubs, members fixed to the shaft hubs and having walls which inclose the end portions of the sleeve and extend over the outer side of the sleeve and spaced apart therefrom, packing material between said walls and the outer side of the sleeve, said walls and packing forming a chamber communicating with the interior of the sleeve to receive the oil from the interior of the coupling under centrifugal force, the pressure thus created being exerted upon the packing to force the same to its seat to prevent the escape of oil.

4. A flexible shaft coupling comprising a pair of shaft hubs, a flanged cap member rigidly secured to the outer end of each of said hubs, a one piece sleeve member positioned between said hubs and flanges of said caps which surround the end portions of said sleeve, teeth on said hubs and sleeve adapted to mesh with each other, and packing means comprising a flexible cup and a resilient means within the same, carried by one of said members and engaging the other of said members for forming a fluid tight seal between said members irrespective of the angular relationship of said shaft hubs.

5. A flexible shaft coupling comprising a pair of shaft hubs, a flanged cap rigidly secured to the outer end of each of said hubs, a sleeve positioned between said hubs and the flanges of said caps, said flanges being spaced from said sleeve and being of sufficient depth to surround substantial end portions thereof, teeth on said hubs and sleeve adapted to mesh with each other, means for inserting lubricant into said coupling, and packing means carried by said flanges consisting of a flexible annular cup, and a radially expansible spring within said cup holding the same against said sleeve to form a fluid tight seal between said flanges and sleeve, irrespective of the angular relationship of said shaft hubs, whereby the interior of said coupling may be completely filled with a lubricant.

6. A flexible shaft coupling comprising a pair of shaft hubs, a flanged cap rigidly secured to the outer end of each of said hubs, a one piece cylindrical sleeve positioned between said hubs and the flanges of said caps, said flanges being spaced from said sleeve and being of sufficient depth to surround substantial end portions thereof, teeth on said hubs and sleeve adapted to mesh with each other, means on said sleeve permitting the insertion of a lubricant into said coupling which is to fill completely the interior thereof, flexible packing means carried by said flanges, resilient means within said flexible packing means for pressing the same against said sleeve to form a fluid tight seal therewith, irrespective of the angular relationship of said shaft hubs, said lubricant upon rotation of said coupling acting to more tightly press said flexible means against said sleeve under the action of centrifugal force.

7. A flexible shaft coupling comprising a pair of shaft hubs, a flanged cap rigidly secured to the outer end of each of said hubs, a one piece cylindrical sleeve positioned between said hubs and the flanges of said caps, said flanges being spaced from said sleeve and being of sufficient depth to surround substantial end portions thereof, teeth on said hubs and sleeve adapted to mesh with each other, means for inserting lubricant into said coupling, and flexible packing means carried by said flanges and bearing against said sleeve for forming a fluid tight seal between said flanges and sleeve, irrespective of the angular relationship of said shaft hubs, whereby the interior of said coupling may be completely filled with a lubricant, said flexible packing means being so disposed with respect to the plane of said teeth as to be substantially in the same plane therewith.

8. A flexible shaft coupling comprising a pair of axially aligned shaft hubs the inner ends of which are to be spaced a definite selected distance apart, a flanged cap rigidly secured to the outer end of each of said hubs, said cap flanges extending toward each other with the inner peripheral edges forming uninterrupted flat surfaces perpendicular to the axis of rotation and spaced a predetermined distance apart, said predetermined distance exceeding by a definite amount the selected distance between the shaft hubs, a sleeve positioned between said hubs and said cap flanges, and cooperating teeth on said hubs and sleeve for directly transmitting the torque from one shaft hub to the other.

9. A flexible shaft coupling comprising a pair of axially aligned shaft hubs the inner ends of which are to be spaced a definite selected distance apart, a flanged cap rigidly secured to the outer end of each of said hubs, said cap flanges extending toward each other with the inner peripheral edges forming uninterrupted flat surfaces perpendicular to the axis of rotation and spaced a predetermined distance apart, said predetermined distance bearing a definite relationship to the selected distance between the shaft hubs, a one piece cylindrical sleeve positioned between said hubs and said cap flanges, and cooperating teeth on said hubs and sleeve for directly transmitting the torque from one shaft hub to the other.

10. A flexible shaft coupling comprising a pair of substantially identical axially aligned shaft hubs to be arranged with the inner ends a definite selected distance apart, a flanged cap rigidly secured to the outer end of each of said hubs, said cap flanges extending toward each other and having true cylindrical outer surfaces of equal diameter and length, the inner peripheral edges of said cap flanges forming uninterrupted flat surfaces perpendicular to the axis of rotation and being spaced a predetermined distance apart, which distance exceeds by a definite amount the selected distance between the shaft hubs, a sleeve positioned between said hubs and cap flanges, cooperating teeth on said hubs and sleeves, said true cylindrical outer flange surfaces presenting accurate surfaces for the determination of shaft misalignment.

11. A flexible shaft coupling comprising a pair of substantially identical axially aligned shaft hubs to be arranged with the inner ends a definite selected distance apart, a flanged cap rigidly secured to the outer end of each of said hubs, said cap flanges extending toward each other and having true cylindrical outer surfaces of equal diameter and length, the inner peripheral edges of said cap flanges forming uninterrupted flat surfaces perpendicular to the axis of rotation and being spaced a predetermined distance apart, which distance bears a definite relationship to the selected distance between the shaft hubs, whereby the distance between said hubs may be always ascertained without disassembly of the coupling, a one piece sleeve positioned between said hubs and cap flanges, cooperating teeth on said hubs and sleeve, said true cylindrical outer flange surfaces presenting spaced accurate measuring surfaces for positively determining the degree of shaft misalignment.

12. A flexible shaft coupling comprising a pair of axially aligned shaft hubs the inner ends of which are to be spaced a definite selected distance apart, a flanged cap rigidly secured to the outer end of each of said hubs, said cap flanges extending toward each other with the inner peripheral edges forming uninterrupted flat surfaces perpendicular to the axis of rotation and spaced a predetermined distance apart, said predetermined distance bearing a definite ratio to the selected distance between the shaft hubs, a sleeve positioned between said hubs and said cap flanges, and cooperating teeth on said hubs and sleeve for directly transmitting the torque from one shaft hub to the other, said hub teeth having convex side faces with the wall between the roots of each of said teeth similarly convexly curved and said sleeve teeth having plane side and top faces whereby the hub teeth will have direct bearing and rocking contact at all times with the faces of said sleeve teeth.

13. A flexible shaft coupling adapted to be completely filled with a lubricant, comprising a pair of shaft hubs, a flanged cap rigidly secured to the outer end of each of said hubs, a one piece sleeve positioned between said hubs and the flanges of said caps which surround the end portions of said sleeve, teeth on said hubs and sleeve adapted to mesh with each other, the wall between the roots of said hub teeth having a convex curvature longitudinally of said hub which wall surface is adapted to have rocking and bearing contact with the top faces of said sleeve teeth for positively supporting said sleeve, flexible packing means carried by said flanges, resilient means within said packing means for holding the same against said sleeve to form a fluid tight seal therewith, said lubricant upon rotation of said coupling acting to increase the pressure of said packing against said sleeve under the action of centrifugal force.

14. In a flexible shaft coupling comprising a pair of shaft hubs, a sleeve member telescoped over said shaft hubs, a set of teeth formed on each of said hubs, each hub tooth having convex side faces and the walls between the roots of said hub teeth being similarly convexly curved, a set of teeth formed at the ends of said sleeve member each of said teeth having plane side faces and the top faces of said sleeve teeth having surfaces coincident with a cylindrical surface, said hub teeth and said sleeve teeth cooperating with each other for torque transmission, the plane side faces and top faces of the sleeve teeth having positive contact with the convex side faces and convex wall of said hub teeth whereby said sleeve will be rockingly supported at all points along the line of contact between said teeth throughout the entire peripheral circuit thereof.

In testimony whereof, I affix my signature.

JULIAN S. LOEWUS.